US012675501B2

(12) United States Patent
Chen et al.

(10) Patent No.: US 12,675,501 B2
(45) Date of Patent: Jul. 7, 2026

(54) EFFICIENT SYNCHRONIZATION MECHANISMS FOR GRAPH DATABASES

(71) Applicants: Lemon Inc., Grand Cayman (KY); Beijing Volcano Engine Technology Co., Ltd., Beijing (CN)

(72) Inventors: Cheng Chen, Singapore (SG); Wei Zhang, Beijing (CN); Zhigang Zeng, Beijing (CN); Shijiao Yang, Beijing (CN); Bingyu Zhou, Beijing (CN); Huiming Zhu, Beijing (CN); Chao Chen, Beijing (CN); Yongjun Zhao, Beijing (CN); Yingqian Hu, Beijing (CN); Miaomiao Cheng, Beijing (CN); Meng Li, Beijing (CN); Hongfei Tan, Beijing (CN); Mengjin Liu, Beijing (CN); Hexiang Lin, Beijing (CN); Shuai Zhang, Beijing (CN); Lei Zhang, Beijing (CN)

(73) Assignees: Lemon Inc., Grand Cayman (KY); Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/977,258

(22) Filed: Dec. 11, 2024

(65) Prior Publication Data

US 2025/0103613 A1 Mar. 27, 2025

(51) Int. Cl.
*G06F 16/00* (2019.01)
*G06F 16/23* (2019.01)
(Continued)

(52) U.S. Cl.
CPC .......... *G06F 16/27* (2019.01); *G06F 16/2358* (2019.01); *G06F 16/9024* (2019.01)

(58) Field of Classification Search
CPC ... G06F 16/27; G06F 16/2358; G06F 16/9024
See application file for complete search history.

(56) References Cited

U.S. PATENT DOCUMENTS 9,280,591 B1 *  3/2016  Kharatishvili .......... G06F 16/27
9,507,843 B1 * 11/2016  Madhavarapu ..... G06F 16/2358
(Continued)

FOREIGN PATENT DOCUMENTS

CN            112015807 A  * 12/2020  ........... G06F 16/215

OTHER PUBLICATIONS

Wang et al., "Bw-tree An Evolution of Bw-tree on Fast Storage",Jul. 23, 2024,IEEE,pp. 1-20 (Year: 2024).*
(Continued)

*Primary Examiner* — Alexander Khong
(74) *Attorney, Agent, or Firm* — Alleman Hall LLP

(57) ABSTRACT

Implementations for I/O efficient synchronization on a graph database are provided. One example includes a computing system comprising: processing circuitry and memory storing instructions that, during execution, causes the processing circuitry to: implement the graph database using at least: a read-write node and a read-only node operating in cache memory; and a shared storage for data persistence, wherein the shared storage stores a mapping table of the graph database; receive an update query; update the read-write node based on the update query; write, using the read-write node, a set of logs corresponding to the update query to a write-ahead log journal in the shared storage; and retrieve, using the read-only node, the set of logs from the write-ahead log journal.

20 Claims, 8 Drawing Sheets

(51) Int. Cl.
  G06F 16/27 (2019.01)
  G06F 16/901 (2019.01)

(56) References Cited

U.S. PATENT DOCUMENTS

| | | | | | |
|---|---|---|---|---|---|
| 9,519,664 | B1 * | 12/2016 | Kharatishvili | .......... | G06F 16/27 |
| 9,613,120 | B1 * | 4/2017 | Kharatishvili | ...... | G06F 16/2358 |
| 11,386,072 | B1 * | 7/2022 | Narayan | .............. | G06F 16/273 |
| 11,816,073 | B1 * | 11/2023 | Chakrabarti | .......... | G06F 16/252 |
| 11,921,699 | B1 * | 3/2024 | Govindagowda | ....... | G06F 16/27 |
| 11,947,555 | B1 * | 4/2024 | Mohideen | ........... | G06F 16/2471 |
| 12,007,954 | B1 * | 6/2024 | Chakrabarti | ............ | G06F 9/542 |
| 12,105,692 | B1 * | 10/2024 | Kumar | .................. | G06F 16/278 |
| 12,147,317 | B1 * | 11/2024 | Mohideen | ........... | G06F 11/1471 |
| 12,242,505 | B1 * | 3/2025 | Shankar | .................. | G06F 16/27 |
| 12,292,881 | B1 * | 5/2025 | Verbitski | ............. | G06F 16/2379 |
| 12,346,327 | B1 * | 7/2025 | Brooker | ........... | G06F 16/24553 |
| 2024/0256605 | A1 * | 8/2024 | Schilders | .............. | G06F 16/245 |
| 2024/0257417 | A1 * | 8/2024 | Schilders | ............ | G06F 16/9024 |
| 2025/0173338 | A1 * | 5/2025 | Shanthakumar | ........ | G06F 16/27 |
| 2025/0298784 | A1 * | 9/2025 | Mohammed | .......... | G06F 16/221 |

OTHER PUBLICATIONS

Levandoski, J. et al. "The Bw-Tree: A B-tree for New Hardware Platforms," Proceedings of the 2013 IEEE 29th International Conference on Data Engineering (ICDE), Apr. 8, 2013, Brisbane, QLD, Australia, 12 pages.

Li, C. et al., "ByteGraph: A High-Performance Distributed Graph Database in ByteDance," Proceedings of the VLDB Endowment, vol. 15, No. 12, Aug. 1, 2022, 13 pages.

European Patent Office, Extended European Search Report Issued in Application No. 25197421.8, Jan. 23, 2026, Germany, 12 pages.

Zhang, W. et al., "BG3: A Cost Effective and I/O Efficient Graph Database in Bytedance," Proceedings of "Sigmod/ Pods '24: International Conference on Management of Data", Jun. 9, 2024, Santiago, Chile, 13 pages.

* cited by examiner

MAPPING TABLE 202

| ID | PTR |
|----|-----|
| $N_1$ | $P_1$ |
| $N_2$ | $P_2$ |
| $N_3$ | $P_3$ |
| $N_4$ | $P_4$ |
| ... | ... |

ROOT $N_1$

200

INTERNAL $N_3$

INTERNAL $N_2$

206

LEAF $N_4$

DATA ENTRIES 204

...

300

600

IMPLEMENTING A GRAPH DATABASE 602

THE GRAPH DATABASE INCLUDES AT LEAST A READ-WRITE (RW) NODE AND A READ-ONLY (RO) NODE OPERATING IN CACHE MEMORY

THE GRAPH DATABASE INCLUDES A SHARED STORAGE FOR DATA PERSISTENCE

SHARED STORAGE INCLUDES AN APPEND-ONLY CLOUD STORAGE

GRAPH DATABASE IS A BW-TREE DATABASE

RECEIVING AN UPDATE QUERY 604

UPDATING THE READ-WRITE NODE BASED ON THE UPDATE QUERY 606

PERFORMING A PAGE SPLIT

WRITING, USING THE RW NODE, A SET OF LOGS CORRESPONDING TO THE UPDATE QUERY TO A WRITE-AHEAD LOG (WAL) JOURNAL 608

THE SET OF LOGS DESCRIBES INSTRUCTIONS TO PERFORM THE UPDATE QUERY

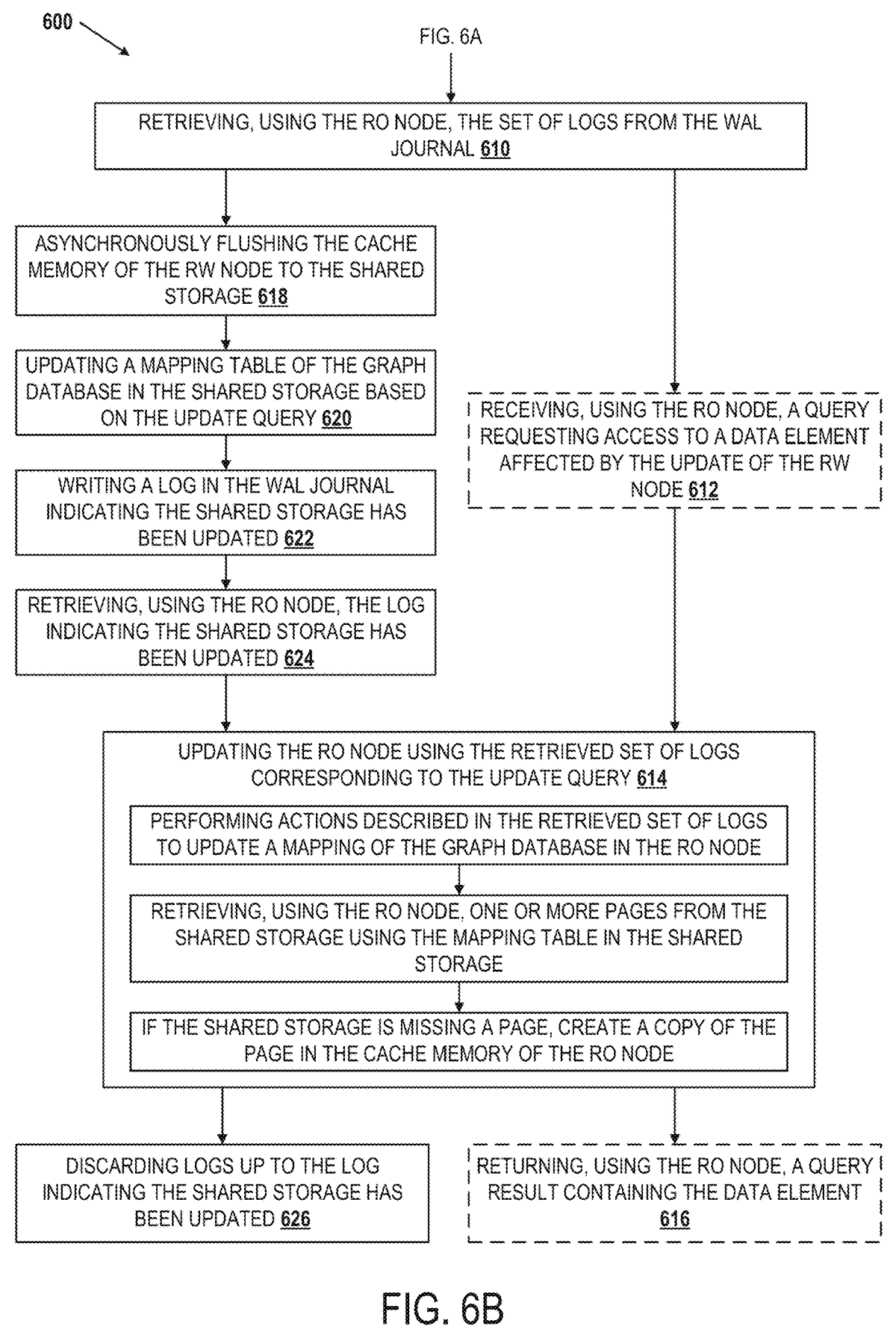

RETRIEVING, USING THE RO NODE, THE SET OF LOGS FROM THE WAL JOURNAL 610

ASYNCHRONOUSLY FLUSHING THE CACHE MEMORY OF THE RW NODE TO THE SHARED STORAGE 618

UPDATING A MAPPING TABLE OF THE GRAPH DATABASE IN THE SHARED STORAGE BASED ON THE UPDATE QUERY 620

RECEIVING, USING THE RO NODE, A QUERY REQUESTING ACCESS TO A DATA ELEMENT AFFECTED BY THE UPDATE OF THE RW NODE 612

WRITING A LOG IN THE WAL JOURNAL INDICATING THE SHARED STORAGE HAS BEEN UPDATED 622

RETRIEVING, USING THE RO NODE, THE LOG INDICATING THE SHARED STORAGE HAS BEEN UPDATED 624

UPDATING THE RO NODE USING THE RETRIEVED SET OF LOGS CORRESPONDING TO THE UPDATE QUERY 614

PERFORMING ACTIONS DESCRIBED IN THE RETRIEVED SET OF LOGS TO UPDATE A MAPPING OF THE GRAPH DATABASE IN THE RO NODE

RETRIEVING, USING THE RO NODE, ONE OR MORE PAGES FROM THE SHARED STORAGE USING THE MAPPING TABLE IN THE SHARED STORAGE

IF THE SHARED STORAGE IS MISSING A PAGE, CREATE A COPY OF THE PAGE IN THE CACHE MEMORY OF THE RO NODE

DISCARDING LOGS UP TO THE LOG INDICATING THE SHARED STORAGE HAS BEEN UPDATED 626

RETURNING, USING THE RO NODE, A QUERY RESULT CONTAINING THE DATA ELEMENT 616

FIG. 6B

EFFICIENT SYNCHRONIZATION MECHANISMS FOR GRAPH DATABASES

BACKGROUND

A graph database is a type of database that represents and stores data using graph structures. Graph components include nodes, edges, and properties, which can be used to describe and store data entries and their relationships. Such structures enable the use of graph algorithms to analyze relationships among data in ways that would be difficult to see with other methods. As the connectedness and data volume of the graph increase, graph algorithms become a more powerful tool for analyzing and utilizing data cost-effectively. For example, querying relationships in a graph database can involve graph traversal algorithms that take advantage of the connectivity within a graph to provide more efficient querying compared to relational database queries. Paths, distances between nodes, and clustering properties of nodes provide intuitive indicators of various database properties. Because the graph itself explicitly stores relationships, queries and algorithms performed on the graph components can be quickly executed. In contrast, traditional relational database calculates relationships during queries through numerous fundamental operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations for I/O efficient synchronization on a graph database are provided. One example includes a computing system comprising: processing circuitry and memory storing instructions that, during execution, causes the processing circuitry to: implement the graph database using at least: a read-write node and a read-only node operating in cache memory; and a shared storage for data persistence, wherein the shared storage stores a mapping table of the graph database; receive an update query; update the read-write node based on the update query; write, using the read-write node, a set of logs corresponding to the update query to a write-ahead log journal in the shared storage; and retrieve, using the read-only node, the set of logs from the write-ahead log journal.

BRIEF DESCRIPTION OF THE DRAWINGS

FIGS. 6A and 6B show a process flow diagram of an example method for implementing a graph database with I/O efficient synchronization, which can be implemented using the example computing system of FIG. 1.

DETAILED DESCRIPTION

Figure 1:
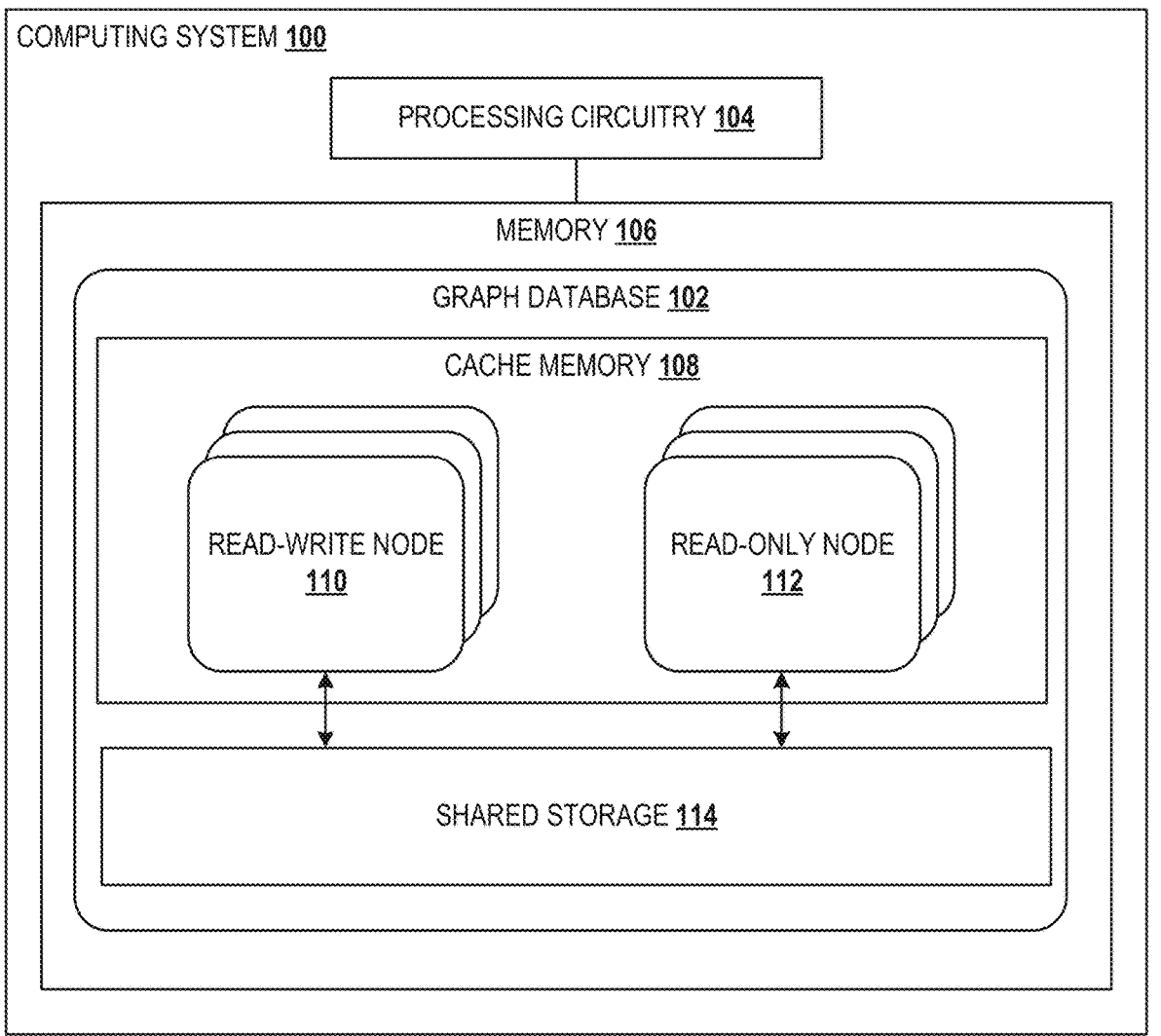
FIG. 1 shows a schematic view of an example computing system for implementing a graph database with I/O efficient synchronization.

Graph databases can be used to store large-scale graph data for various applications. Generally, graph databases are implemented using tree structures to provide powerful algorithmic capabilities, such as fast queries, insertions, deletions, etc. Various types of tree graphs have been contemplated for use in database systems, including but not limited to binary trees, m-ary trees, B-trees, B+ trees, and Bw-trees. Different structures may have different advantages depending on the application. In one example, Bw-trees can be advantageously implemented on a social media platform for storing various types of information relating to users and their actions. In one such application, the interactions of users "liking" a piece of media content (e.g., image, video, etc.) or "following/subscribing" another user can be stored and utilized for various purposes. For example, information relating to each user's preferences for media content can provide support for various functionalities such as providing recommendations based on the user's preferences.

The interactions between users and media content/other users can be stored in various ways. One way includes having each user and media content be represented as a node on a graph. Edges between the nodes can represent a like-action or a follow-action performed by a user on a media content or another user, respectively. The edges, as well as the edge features (e.g., the time when the like-action was performed) can then be stored on the Bw-tree. For example, the source and destination nodes of the edge can be stored as a key, and the edge features can be stored as a corresponding value using a key-value storage engine scheme.

Large-scale graph analysis and learning can be important aspects for various applications, such as e-commerce risk control and content recommendation. These computation-intensive algorithms demand low latency for real-time applications and typically involve deployment on multiple read-only (RO) nodes to scale read-throughput. As such, an efficient leader-follower synchronization mechanism is desirable to ensure that RO nodes promptly receive the latest data from read-write (RW) node(s) to guarantee accuracy and adequate real-time performance. However, weak consistency guarantees from traditional synchronization mechanisms pose significant challenges in scaling out read-throughput across multiple RO nodes. For example, many applications involve graph data that exhibits a power-law distribution where certain read/write requests show pronounced spatial and temporal locality. However, workloads executing on applications with a pronounced locality often causes slow synchronization due to hotspots on some RO nodes that subsequently block the RW node's data flushing to achieve data consistency. Existing leader-follower synchronization schemes generally involve algorithms that only achieve eventual consistency (e.g., redirecting write requests to RO nodes and replaying them to achieve consistency). In an eventually consistent system, the absence of time guarantees in data synchronization can lead to failures in accessing the latest graph snapshot. This inability to synchronize RW and RO nodes within a bounded time interval poses significant challenges in scaling real-time graph analytics.

In view of the observations above, I/O efficient synchronization mechanisms for graph databases are provided. I/O efficient synchronization mechanisms can be implemented in various ways. In some implementations, an I/O efficient synchronization mechanism is implemented on a Bw-tree graph database that implements a write-once, read-many architecture using a shared storage solution. A write-once, read-many architecture can be implemented where new data is first written to a RW node and then synchronized to RO nodes. Synchronization between the RW and RO nodes can be performed using a write-ahead log (WAL) journal that provides low-latency updates to the RO nodes. To address certain data consistency issues, multiple versions of data can be maintained within a shared storage layer. Additionally, parallel mechanisms can be provided to further enhance I/O efficiency. These and other related implementations can enable an efficient synchronization mechanism that offers high-performance and strong consistency guarantees to provide scalable real-time graph analytics effectively.

Turning now to the figures, efficient synchronization mechanisms for graph databases are depicted and described in further detail. FIG. 1 shows a schematic view of an example computing system 100 for implementing a graph database 102 with I/O efficient synchronization. The example computing system 100 includes processing circuitry 104 and memory 106 storing instructions that, during execution, cause the processing circuitry 104 to perform the processes described herein. The example computing system 100 can be implemented with various types of computing devices, including but not limited to personal computers, servers, and mobile devices. For example, the computing system 100 can include a plurality of computing devices, and processing circuitry 104 and memory 106 may each include multiple discrete components spread across multiple computing devices (e.g., processing circuitry 104 can include multiple processors within a single device or spread across multiple devices). The devices may be locally or remotely located. In some implementations, the computing system 100 is implemented as cloud storage servers. The example computing system 100 can also include non-depicted components for providing various functionalities, including components on individual computing devices.

The graph database 102 can be implemented in various ways. In some implementations, the graph database 102 implements a tree structure. Examples of tree structures include but are not limited to binary trees, m-ary trees, B-trees, B+ trees, and Bw-trees. In the depicted example, the graph database 102 includes a cache memory layer 108 that implements graph-native data management capabilities for the graph database 102 using a mix of RW node(s) 110 capable of performing read and write operations and RO node(s) 112 capable of performing read operations. Any number of RW nodes and RO nodes can be implemented. In some implementations, the graph database 102 includes at least one RW node 110 and at least one RO node 112. In the depicted example, the graph database 102 includes a plurality of RW nodes 110 and a plurality of RO nodes 112. Generally, the database 102 can include more RO nodes 112 than RW nodes 110 for scaling out read-throughput capabilities. The RW and RO nodes 110, 112 are in communication with a shared storage 114 implemented for data persistence. The shared storage 114 can be implemented in various ways. In some implementations, the shared storage 114 is an append-only storage. For example, the shared storage 114 can be implemented such that existing data is immutable, which can provide data consistency and improved performance. Additionally or alternatively, the shared storage 114 is implemented using a cloud storage solution.

Once a RW node 110 writes new data to the shared storage 114, the RO nodes 112 can immediately read the new data from the shared storage 114. Although the shared storage layer 114 provides consistency after data is written, there can be still be issues of data inconsistency on the RO nodes 112. In some implementations, each RO node 112 maintains a cache of data tailored to its read workload. Without meticulous synchronization between RW 110 and RO nodes 112, this can lead to data inconsistency on the RO nodes 112 when certain query requests are received. To address this issue, I/O efficient synchronization mechanisms can be implemented to synchronize the latest updates from a RW node 110 to the RO nodes 112 in a low-latency, time-efficient manner.

In some implementations, the graph database 102 implements a synchronization mechanism that utilizes a write-ahead log. Upon receiving an update query request that involves a write to the graph database 102, the receiving RW node 110 makes the corresponding updates in their memory. These updates can then be written to the shared storage 114 in the form of a set of logs in a write-ahead log journal, which can be read by the RO nodes 112. Compared to traditional techniques that involve replaying the updates at the RO nodes 112 to align with the RW node's memory, low-latency writes and retrievals of logs can be performed in a more time-efficient manner. The RO nodes 112 can implement a "lazy" log replay mechanism where updates from the RW node 110 can be applied to a RO node 112 in response to a read query request. If there are no read query request, the updates can be applied when the RW node's memory is flushed to the shared storage 114 for data persistence. This enables the RO nodes 112 to maintain data consistency with low-latency.

Figure 2:
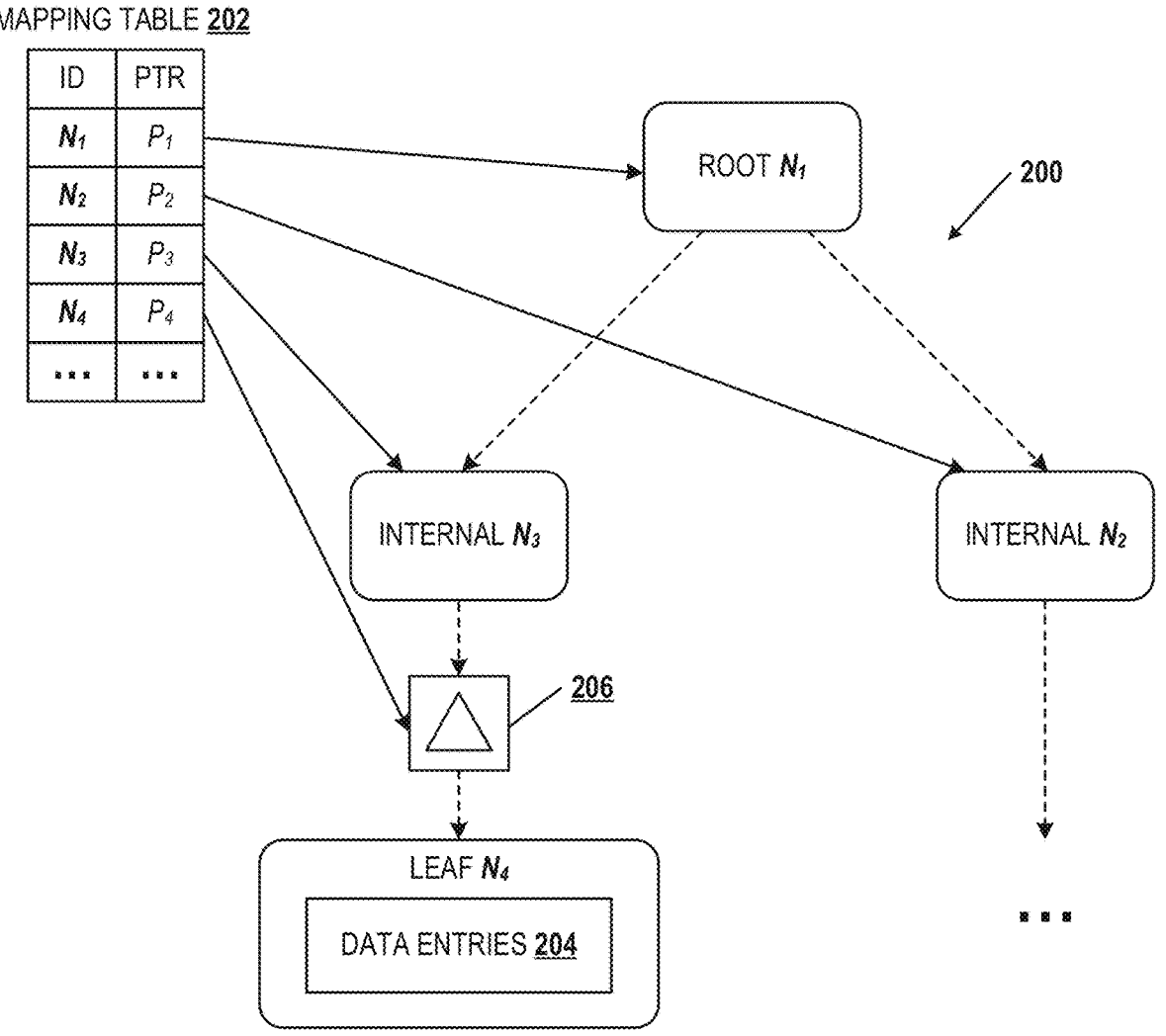
FIG. 2 shows a schematic view of an example Bw-tree graph database, which can be implemented using the example computing system of FIG. 1.

Generally, the graph database 102 is implemented using a tree structure for organizing and managing stored data. Examples of different tree structures that can be utilized for database storage include but are not limited to binary trees, m-ary trees, B-trees, B+ trees, and Bw-trees. FIG. 2 shows a schematic view of an example Bw-tree graph database 200. Bw-tree graph databases can be implemented in various ways. In some implementations, the Bw-tree graph database 200 provides graph-native data management capabilities through nodes implemented in dynamic random-access memory (DRAM). Data persistence can be performed on a shared storage layer, which can be implemented in various ways including but not limited to an append-only cloud storage solution. The Bw-tree graph database 200 is organized using a mapping table 202 that describes the locations of the nodes of the Bw-tree, which can also be referred to as pages of the Bw-tree. The mapping table 202 includes an identifier column that lists identifiers of the nodes and a corresponding pointer column that lists respective pointers to the locations of the nodes. The example Bw-tree database 200 includes at least a root node $N_1$, internal nodes $N_2$ and $N_3$, and a leaf node $N_4$. In some implementations, data entries 204 are stored at the leaf node $N_4$. In other implementations, each of the leaf nodes of the Bw-tree includes a pointer to a respective data block that stores the data entries.

One distinct feature of Bw-trees is the update process. Updates to the Bw-tree graph database involve prepending one or more delta pages to a base page that is to be updated. A delta page describes the changes to be made to the base page to enact the requested updates. The prepended delta page points to the base page, and pointers to the base page are redirected to the delta page. Redirecting pointers can be performed via an atomic operation to ensure system integrity. After several updates, a chain of delta pages can form. As the chain grows, search performance can suffer. To address this, page consolidation can be performed periodically to create a new base page with the prepended delta page updates applied. In the depicted example, a delta page 206 is prepended to the leaf node $N_4$. According, internal node $N_3$ and pointer $P_4$ listed on the mapping table 202 point to the delta page 206, and the delta page 206 points to the leaf node $N_4$.

The data entries 204 can be in any kind of format. In some implementations, each data entry 204 includes a key-value pair. Using the social media platform example described above, each data entry 204 can include information describing a like-action performed by a user on a media content. In some implementations, the Bw-tree graph database 200 stores edge information of a graph where nodes represent users and media content and where an edge between two nodes represents a user (first node) performing a like-action on a media content (second node). In this scenario, whenever a user performs a like-action on a media content, an edge is established between the node representing the user and the node representing the media content. This edge, which describes the source and destination nodes, can be stored in the Bw-tree graph database 200 as the key of a data entry to represent a user performing a like-action on a media content. Edge features (e.g., the time when the like-action was performed) can be stored as a value associated with the key. Additionally or alternatively, the Bw-tree graph database 200 can store information describing relationships between users (e.g., subscriber, follower, etc.). For example, rather than storing an edge between a user node and a media content node, the Bw-tree graph database 200 can store information relating to an edge between users. Directed edges can be used to identify the follower/followee relationship. In some implementations, this relationship is defined by how the information is stored (e.g., first node indicates the follower).

Figure 3:
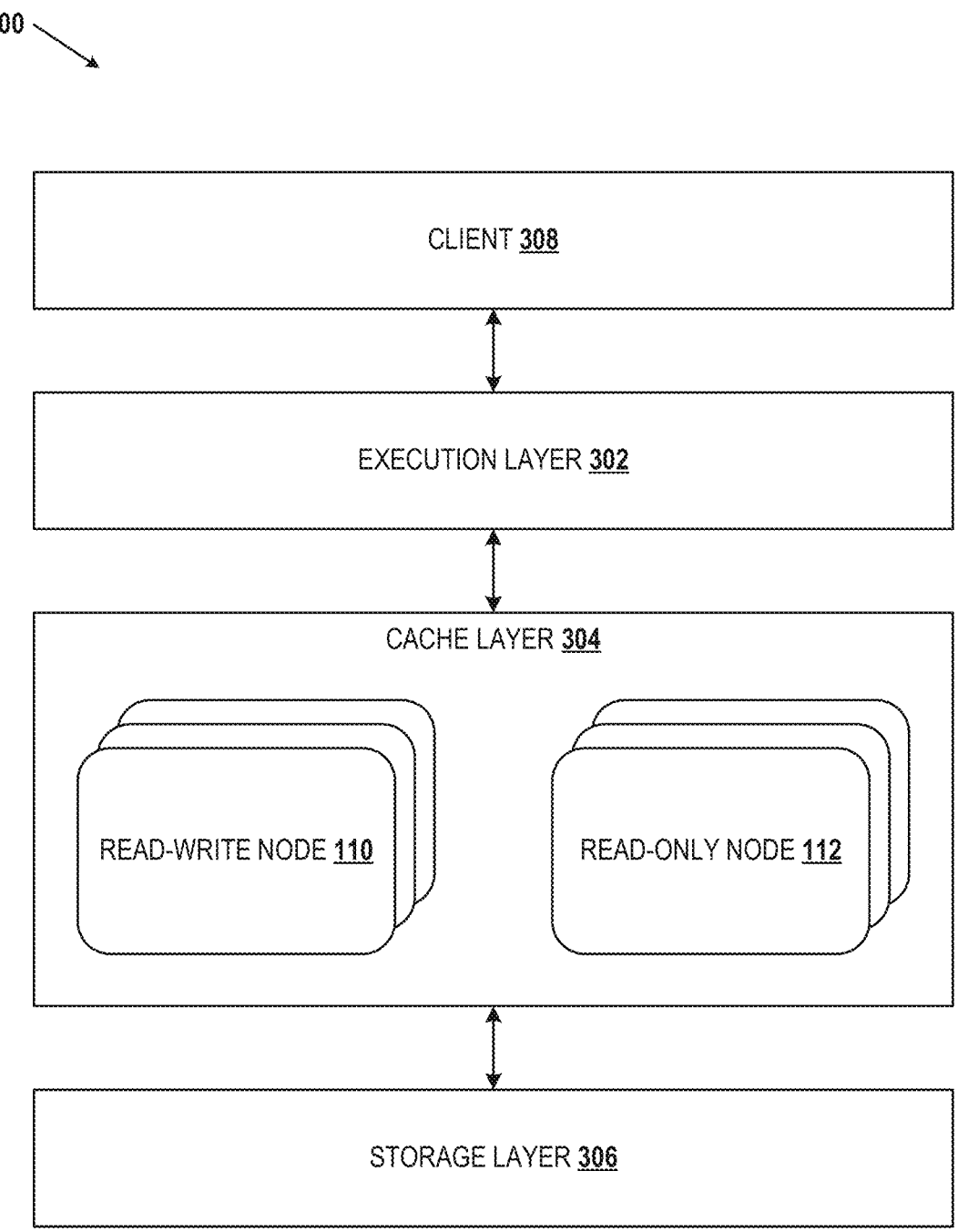
FIG. 3 shows an example architecture for implementing a graph database with I/O efficient synchronization, which can be implemented using the example computing system of FIG. 1.

FIG. 3 shows an example architecture 300 for implementing a graph database with I/O efficient synchronization. The example architecture 300 includes three layers 302-306 implementing the tree graph database, such as the graph database 102 of FIG. 1, that can be accessed/queried by one or more clients 308. The first of the three layers includes an execution layer 302 responsible for converting query language into specific execution plans, which can include handling computation-intensive operations (e.g., sorting, aggregation). The second layer is a cache layer 304 in memory that provides graph-native data management utilizing a tree graph index. The cache layer 304 implements an application interface that provides access to a graph database, such as the graph database 102 of FIG. 1. In the depicted example, the cache layer 304 implements RW nodes 110 and RO nodes 112 to provide data management capabilities, servicing query requests and writing/reading to a shared storage layer 306 responsible for persisting data. The storage layer 306 can be implemented in various ways. In some implementations, the storage layer 306 is an append-only storage. Additionally or alternatively, the storage layer 306 is implemented using a cloud storage solution.

Upon receiving an update query request from a client, the corresponding RW node writes the new data update to its memory. Traditionally, the RW node would flush the updates to the shared storage, and the RO nodes can then read the new data from the shared storage. Although the shared storage provides data consistency, each RO node typically maintains a cache of data tailored to its read workload. This can lead to data inconsistency under certain circumstances when the RO node is attempting to access the newly updated data before it has been flushed to the shared storage.

Figure 4:
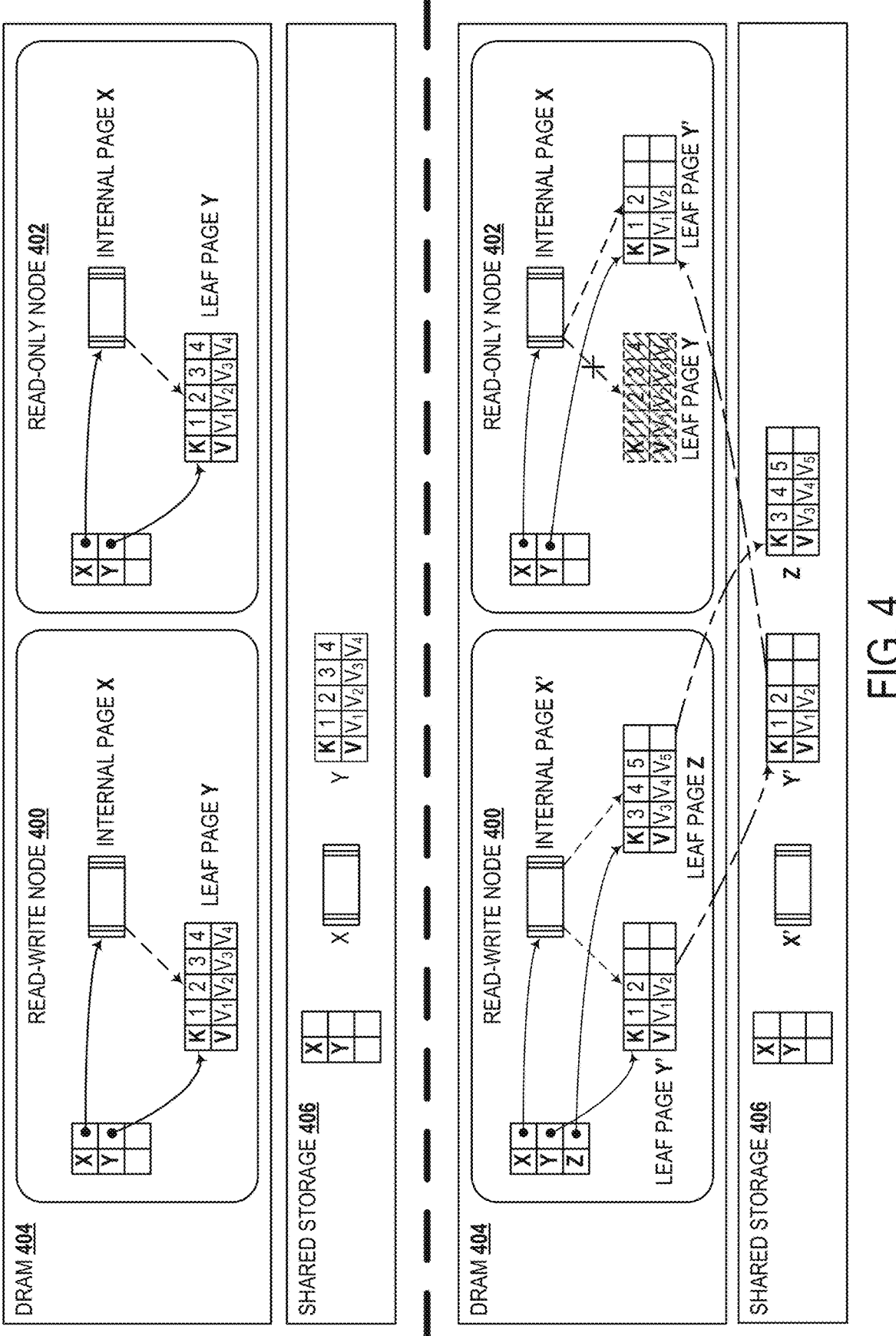
FIG. 4 shows a data inconsistency issue in a Bw-tree graph database without strong synchronization mechanisms.

FIG. 4 shows a data inconsistency issue in a Bw-tree graph database without strong synchronization mechanisms. The example Bw-tree graph database utilizes a design that separates read and write operations. The illustrative example includes a RW node 400 and a RO node 402 operating in dynamic random-access memory 404. In the depicted example, the Bw-tree graph database includes an internal page X that has a leaf node depicted as leaf page Y. The Bw-tree graph database initially stores at least four key-value pairs $\{(1, V_1), (2, V_2), (3, V_3),$ and $(4, V_4)\}$ in leaf page Y. Initially, each of the RW node 400 and the RO node 402 stores internal page X and leaf page Y along with a mapping table that records the positions of the pages. The Bw-tree graph database further includes a shared storage 406 that initially stores the data, including internal page X, leaf page Y, and the Bw-tree graph's mapping table. Accordingly, the data on the RW node 400, the RO node 402, and the shared storage 406 is initially in a consistent state.

In the lower half of FIG. 4, an update query request causes a new data element $(5, V_5)$ to be inserted at the RW node 400. This operation causes a split in the Bw-tree where leaf page Y is split into leaf page Y' and leaf page Z, and the mapping table in the RW node 400 is updated accordingly. As shown in the RW node 400 in the lower half of FIG. 4, half of the data from original leaf page Y, which includes key-value pairs $(3, V_3)$ and $(4, V_4)$, is moved to the new leaf page Z. Additionally, leaf page Z includes the new data element $(5, V_5)$. Internal page X is also updated to internal page X', which includes pointers to the updated page Y' and the new page Z. The RW node 400 then writes the modified mapping table, the updated pages X' and Y', and the new leaf page Z into the shared storage 406 to complete the write process.

During the write process, the RO node 402 can continue to handle read requests, which can cause the cache on the RO node 402 to dynamically evict pages from the DRAM 404. Suppose after the RW node 400 has completed the insertion of data element $(5, V_5)$, the RO node 402 receives a Get (3) query request to retrieve the value for key '3'. At this moment, the RO node 402 does not have page Y in its cache, triggering a read operation from the shared storage 406. Given that page Y in the shared storage 406 has been updated to Y', this results in a consistency error during the Get (3) query as the operation would not be able to locate the data on the now-altered page. Instead, the value for key '3' would be on the new leaf page Z.

Data inconsistency issues can arise from various circumstances depending on the synchronization mechanism implemented and the associated consistency guarantees. In the example of FIG. 4, the primary reason for the inconsistency between the RW node 400 and the RO node 402 is that the corresponding data in the shared storage 406 has already been updated before the latest modifications in RW node's memory are synchronized to RO node's memory. Several solutions have been contemplated to solve the leader-follower consistency problem. One such solution involves asynchronously forwarding Gremlin commands of a RW node's write operations to each RO node. However, this approach is prone to causing disorder or packet loss during the forwarding process, requiring mechanisms such as retries to achieve eventual consistency.

Figure 5:
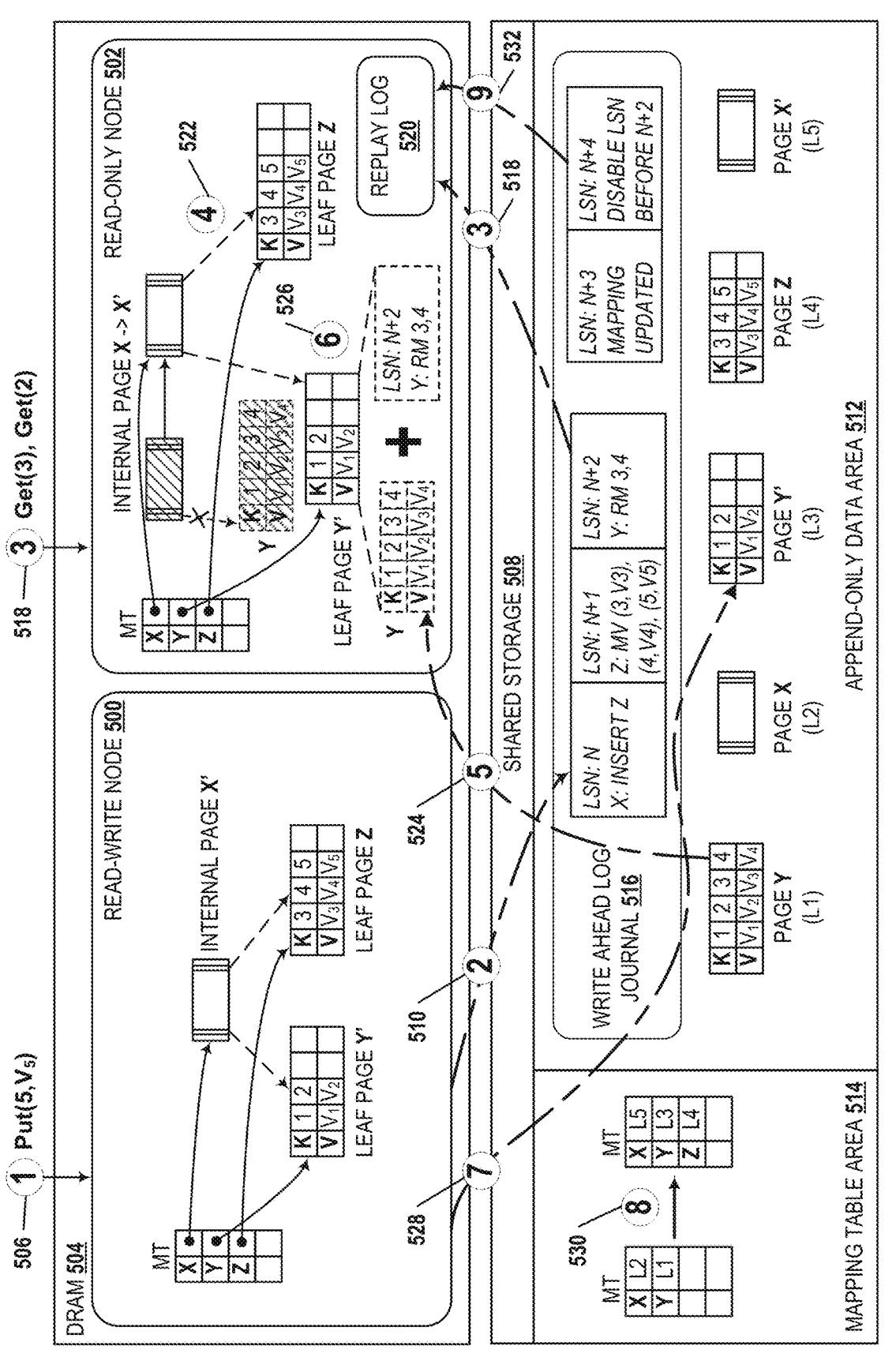
FIG. 5 shows a workflow diagram of a Bw-tree graph database with I/O efficient synchronization, which can be implemented using the example computing system of FIG. 1.

Rather than automatically updating the RO node's memory in response to a write operation on a RW node, the synchronization process for the RO node can be implemented using a lazy log replay mechanism in combination with a WAL journal to provide an efficient, low-latency synchronization mechanism. FIG. 5 shows a workflow diagram of a Bw-tree graph database with I/O efficient synchronization utilizing a lazy log replay mechanism. In the depicted example, the Bw-tree graph database includes a RW node 500 and a RO node 502 operating in DRAM 504. Initially (not depicted), the Bw-tree graph database stores an internal page X that has a leaf page Y, which stores at least four key-value pairs $\{(1, V_1), (2, V_2), (3, V_3), \text{and } (4, V_4)\}$. The workflow starts at a first step 506 where the RW node 500 receives a Put $(5, V_5)$ query request to insert a new key-value pair $(5, V_5)$ into the Bw-tree graph database. Similar to the example of FIG. 4, the Put $(5, V_5)$ query request results in a split in the Bw-tree where leaf page Y is split into leaf page Y' and leaf page Z. After the split, leaf page Y' stores key-value pairs $(1, V_1)$ and $(2, V_2)$, and leaf page Z stores key-value pairs $(3, V_3)$, $(4, V_4)$, and $(5, V_5)$. The internal page X is updated to internal page X', which includes pointers to the updated page Y' and the new page Z. The mapping table is also updated accordingly to include the location of leaf page Z.

The split generates dirty pages: internal page X', leaf pages Y', and Z. Before flushing these pages to a shared storage 508, at a second step 510, the split process (or any other update query process) is recorded as a set of logs. In the depicted example, the shared storage 508 is an append-only storage where existing data is immutable. As shown, the shared storage 508 includes an append-only data area 512 and a mapping table area 514. The set of logs is written to a WAL journal 516 located in the shared storage 508 immediately after the RW node 500 is updated in accordance with the Put $(5, V_5)$ query request. In the depicted example, the split process is recorded with log sequence numbers (LSN) N to N+2, which describes the steps to perform the update associated with the query request. The set of logs written to the WAL journal 512 can be, at a third step 518, instantaneously (or near instantaneously) read into the RO node's memory. In the depicted example, the RO node 502 caches the logs in memory as lazy replay logs 520.

Concurrently at the third step 518, the RO node 502 can receive a query request, Get (2) and Get (3). These operations cause cache miss actions for pages Y and Z in the RO cache. At a fourth step 522, using the lazy replay logs 520, the cached page X in the RO node is updated to page X', which is in the same state as the RW node's page X'. In the depicted example, this can be performed using the log LSN N, which describes the action of inserting page Z into page X. At a fifth step 524, the RO node 502 looks up the old mapping in the shared storage 508 to fetch page Y. At this point in time, the mapping table in the mapping table area 514 of the shared storage 508 is unmodified. At a sixth step 526, the RO node 502 replays the relevant log on the retrieved page Y such that the page is in the same state as the RW node's page Y'. In the depicted example, log LSN N+2 is the relevant log for generating page Y'. As shown, log LSN N+2 describes the action of removing key-value pairs with the keys '3' and '4'.

In some circumstances, the old mapping in the mapping table area 514 of the shared storage 508 does not contain a page recorded in the set of logs in the WAL journal 516. This indicates that said page is newly generated. In the depicted example, page Z is a newly generated page and would not be in the old mapping table in the shared storage 508. In such cases, the RO node 502 can directly create the page in its memory during the sixth step 524. For example, leaf page Z can be created in the RO node 502 using the replay logs 520. At this point, the data in the RO node 502 is consistent with the latest data in the RW node 500.

Independent of whether the RO node 502 receives a query request, the three dirty pages (pages X', Y', and Z) generated by the split action in the RW node 500 are asynchronously flushed to the shared storage 508 by a background thread pool at a seventh step 528. After the dirty data is flushed to the append-only data area 512, the data version in the shared storage 508 is updated by updating the mapping table in the mapping table area 514 at an eighth step 530. As shown, the old mapping table records the memory locations of pages X and Y as L2 and L1, respectively. After the update, the mapping table now includes memory locations (L5 and L3) to the updated pages (X' and Y'). The mapping table also includes the memory location of the new page Z (memory location L4). A log describing the update (LSN N+3) is synchronously written in the WAL journal 516, indicating that the data in shared storage 508 has completed all modifications up to LSN N+4. At a ninth step 532, the RO node 502 reads this log item and discards all records in the lazy replay log 520 with lower LSN numbers (less than N+4). At this point, the RW node 500, the RO node 502, and the shared storage 508 are consistent.

The synchronization mechanism shown in FIG. 5 synchronizes the latest modifications from the RW node's memory to the log area 520 in RO node's memory through the WAL journal 516. Given that each WAL journal item is small in size and that the shared storage 508 provides consistency and low write latency, updates to the RW node 500 can be immediately visible to all of the RO nodes, including the RO node 502. This process guarantees correctness of the data by enabling the immediate updating of the outdated data in the RO node's memory to the latest version. Using logs, the data in the RO node's memory can be aligned with the RW node's memory in an efficient way. Meanwhile, before the dirty data on the RW node 500 is asynchronously flushed to the shared storage 508, the mapping table in the shared storage 508 continues to point to the old version of the data. This approach guarantees that the RO node 502 can access precise data in its memory by merging the old version data with the WAL journal 516. When the mapping table is updated, the RO node 502 is synchronously updated through the log describing that the mapping table has been updated.

To address the high-intensity read and write requests, accumulated dirty pages on the RW node 500 can be flushed by a background thread once the accumulated dirty pages on the RW node 500 reach a specific threshold. Using the lazy replay log mechanism, the pressure of the RO nodes reading data from the shared storage 508 can be reduced. Updates from the RW node 500 can be applied to the RO node's memory only when a page is brought into the RO node's memory due to an upper-layer read request. Since the data that each RO node requests can differ significantly from what is written to the RW node 500, such a scheme can result in a highly efficient synchronization mechanism. To improve the efficiency of searching the log area 520 in the RO node's memory, an index keyed by page number can be utilized. In some implementations, multiple modifications of the same page in the log area can be merged in the background.

FIGS. 6A and 6B show a process flow diagram of an example method 600 for implementing a graph database with I/O efficient synchronization. The method 600 includes, at step 602, implementing a graph database. The graph database can be implemented in various ways. In some implementations, the graph database is a Bw-tree database. Other tree structures can also be implemented. Examples of such include but are not limited to binary trees, m-ary trees, B-trees, and B+ trees. Different architectures can be utilized in implementing the graph database. In some implementations, the graph database includes at least three layers, including an execution layer, a cache memory layer, and a persistent storage layer.

The execution layer can be implemented to handle computation-intensive operations from the application. The cache memory layer can be implemented using structured nodes that provide various graph-native data management capabilities. In some implementations, the graph database includes at least one read-write node and at least one read-only node. The nodes can be implemented in any type of cache memory, such as DRAM. Any number and mix of read-write nodes and read-only nodes can be utilized. In some implementations, the graph database is implemented with more read-only nodes than read-write nodes. The persistent storage layer can be implemented in various ways. Generally, the persistent storage layer utilizes a shared storage accessible by the read-write nodes and read-only nodes. The shared storage can be implemented using various forms of memory. In some implementations, the shared storage includes an append-only storage. Additionally or alternatively, the shared storage is implemented using a cloud storage solution.

The method 600 includes, at step 604, receiving an update query via a read-write node. The update query can be any type of request for updating the graph database. For example, the update query can include any type of write requests that insert, delete, and/or modify data elements of the graph database. Upon receiving the update query, the graph database implements an I/O efficient synchronization mechanism. The synchronization mechanism includes, at step 606, updating the read-write node based on the update query. For example, in implementations utilizing a Bw-tree structure, the update can include updating the relevant pages and data elements in the memory of the read-write node in accordance with the received update query.

The method 600 includes, at step 608, writing, using the read-write node, a set of logs to a write-ahead log journal. In some implementations, the set of logs corresponds to the update query. For example, the set of logs can describe instructions to perform the update query, which can be steps to perform to reach a consistent state with the memory of the read-write node. In some implementations, the set of logs is implemented as write-ahead logs that are written to a write-ahead log journal in the shared storage. Each log can include a log sequence number along with instructions to perform the associated update step. The method 600 includes, at step 610, retrieving, using a read-only node, the set of logs from the write-ahead log journal. The set of logs can be retrieved as soon as the set of logs is written to the write-ahead log journal. This provides data consistency as the read-only node can now service query requests that access updated pages/data elements using the retrieved set of logs. Furthermore, a strong guarantee of data consistency can be provided as the steps of writing and retrieving logs can be performed with low latency.

The method 600 includes, at step 612, receiving, using the read-only node, a query. The query can request access to a data element affected by the update of the read-write node. Such queries can cause cache miss actions for the relevant pages in the cache memory of the read-only node. In such a situation, the read-only node can perform steps to recreate the update of the read-write node such that the read-only node's memory is in a state consistent with the read-write node's memory to provide query results. The method 600 includes, at step 614, updating the read-only node using the retrieved set of logs corresponding to the update query. The read-only node can be updated in various ways. In some implementations, the update process includes performing actions described in the retrieved set of logs. Such actions can include an update to a mapping of the graph database in the read-only node. The set of logs can also describe actions for updating pages. For example, the set of logs can describe inserting a data element into a page, removing a data element from a page, a page split action, a page deletion action, etc. In some implementations, the update process includes retrieving, using the read-only node, one or more pages from the shared storage using the mapping table in the shared storage. Actions described in the set of logs can be performed to bring the read-only node into a state consistent with the read-write node. If the shared storage is missing a page, a copy of the page can be created in the cache memory of the read-only node. The method 600 includes, at step 616, returning, using the read-only node, a query result containing the data element affected by the update of the read-write node.

Irrespective of whether the read-only node receives a query request for accessing an updated data element, the method 600 includes, at step 618, asynchronously flushing the cache memory of the read-write node to the shared storage. The update of the read-write node in step 606 can create dirty pages, which are pages in cache with modified data that have not been moved to persistent storage. At some point, the dirty pages need to be flushed to the shared storage for data persistence. In some implementations, the shared storage is an append-only storage. The dirty pages are stored in addition to the outdated data.

The method 600 includes, at step 620, updating a mapping table of the graph database in the shared storage based on the update query. Updating the mapping table can be performed in various ways. Locations of updated pages can be updated, and new entries for newly created pages can be added. For example, in an append-only storage solution, the mapping table is updated to point to new memory locations of the updated pages, making the memory locations of outdated data inaccessible. Synchronously, the method 600 includes, at step 622, writing a log in the WAL journal indicating that the shared storage has been updated. By synchronously writing the log, the system is aware that the mapping table now points to updated pages. The method 600 includes, at step 624, retrieving, using the read-only node, the log indicating that the shared storage has been updated. The log can be retrieved as soon as the log is written to the write-ahead log journal. This way, the read-only node will not try to access an old page using the mapping table. For instance, even if the read-only node receives a query requesting access to an updated data element (step 616), the read-only node can rely on the new log to retrieve updated pages rather than attempt to retrieve an old page and update it using the previously retrieved set of logs corresponding to the update query request. As such, the behavior of the read-only node and how it updates it state to be consistent with the read-write node and/or the shared storage can depend on whether it receives a relevant query request before/after the read-write node flushes its memory to the shared storage.

The method 600 includes, at step 626, discarding logs up to the log indicating that the shared storage has been updated. After the mapping table and shared storage have been updated, the system (including the read-write node and the read-only node) is data consistent. As such, the logs corresponding to the update query become obsolete. As such, the set of logs corresponding to the update query can be discarded since the nodes and shared storage are synchronized with information up to the log indicating that the shared storage has been updated.

FIGS. 6A and 6B illustrate a class of methods for implementing an I/O efficient synchronization mechanism. Other variations can also be implemented in accordance with the present disclosure. For example, a similar synchronization mechanism can be implemented for a graph database utilizing various types of tree structures. Generally, the synchronization mechanisms as described herein provide efficient processing and strong data consistency for write-once, read-many architectures. For example, utilization of a WAL journal provides low-latency updates to the read-only nodes, enabling the read-write node to flush its memory to the shared storage without regards to the current state of the read-only nodes. These and other related implementations can enable an efficient synchronization mechanism that offers high-performance and strong consistency guarantees to provide scalable real-time graph analytics effectively.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
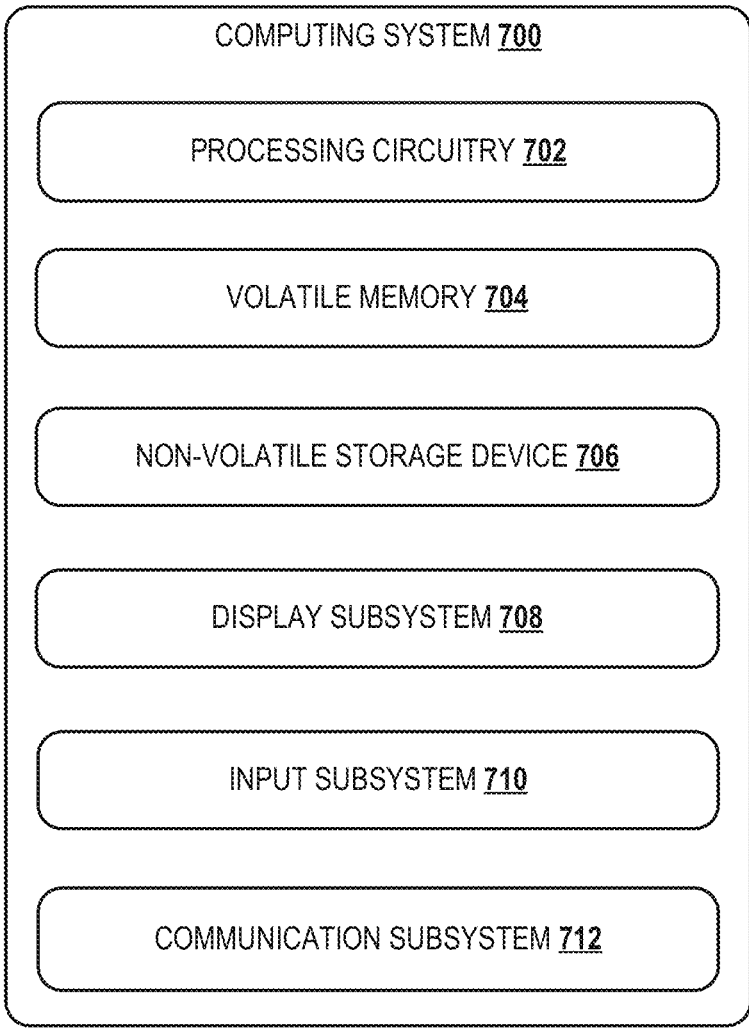
FIG. 7 shows a schematic view of an example computing system that can enact one or more of the methods and processes described herein.

FIG. 7 schematically shows a non-limiting embodiment of a computing system 700 that can enact one or more of the methods and processes described above. Computing system 700 is shown in simplified form. Computing system 700 may embody the computing system 100 described above and illustrated in FIG. 1. Components of computing system 700 may be included in one or more personal computers, server computers, tablet computers, home-entertainment computers, network computing devices, video game devices, mobile computing devices, mobile communication devices (e.g., smart phone), and/or other computing devices.

Computing system 700 includes processing circuitry 702, volatile memory 704, and a non-volatile storage device 706. Computing system 700 may optionally include a display subsystem 708, input subsystem 710, communication subsystem 712, and/or other components not shown in FIG. 7.

Processing circuitry 702 includes a logic processor that can be implemented with one or more physical devices configured to execute instructions. For example, the processing circuitry 702 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processing circuitry 702 may include one or more physical processors configured to execute software instructions. Additionally or alternatively, the processing circuitry 702 may include one or more hardware logic circuits or firmware devices configured to execute hardware-implemented logic or firmware instructions. Processors of the processing circuitry 702 may be single-core or multi-core, and the instructions executed thereon may be configured for sequential, parallel, and/or distributed processing. Individual components of the processing circuitry 702 optionally may be distributed among two or more separate devices, which may be remotely located and/or configured for coordinated processing. Aspects of the processing circuitry 702 may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the processing circuitry 702 to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory, semiconductor memory, and/or magnetic memory, or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by processing circuitry 702 to temporarily store information during processing of software instructions. It will be appreciated that volatile memory 704 typically does not continue to store instructions when power is cut to the volatile memory 704.

Aspects of processing circuitry 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via processing circuitry 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with processing circuitry 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, camera, or microphone.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 700 to send and/or receive messages to and/or from other devices via a network such as the Internet.

The following paragraphs provide additional description of the subject matter of the present disclosure. One example provides a computing system for efficient synchronization on a graph database, the computing system comprising: processing circuitry and memory storing instructions that, during execution, causes the processing circuitry to: implement the graph database using at least: a read-write node and a read-only node operating in cache memory; and a shared storage for data persistence, wherein the shared storage stores a mapping table of the graph database; receive an update query; update the read-write node based on the update query; write, using the read-write node, a set of logs corresponding to the update query to a write-ahead log (WAL) journal in the shared storage; and retrieve, using the read-only node, the set of logs corresponding to the update query from the WAL journal. In this example, additionally or alternatively, the instructions, during execution, further causes the processing circuitry to: asynchronously flush the cache memory of the read-write node to the shared storage; update the mapping table of the graph database in the shared storage based on the update query; synchronous with the updating of the mapping table in the shared storage, write a log in the WAL journal indicating the shared storage has been updated; and retrieve, using the read-only node, the log indicating the shared storage has been updated. In this example, additionally or alternatively, the instructions, during execution, further causes the processing circuitry to: update the read-only node using the retrieved set of logs corresponding to the update query; and discard logs up to the log indicating the shared storage has been updated, including the retrieved set of logs corresponding to the update query. In this example, additionally or alternatively, the instructions, during execution, further causes the processing circuitry to: receive, using the read-only node, a query requesting access to a data element affected by the update of the read-write node; update the read-only node using the retrieved set of logs corresponding to the update query; and return, using the read-only node, a query result containing the data element. In this example, additionally or alternatively, the instructions, during execution, further causes the processing circuitry to: asynchronously flush the cache memory of the read-write node to the shared storage; update the mapping table of the graph database in the shared storage based on the update query; synchronous with the updating of the mapping table in the shared storage, write a log in the WAL journal indicating the shared storage has been updated; retrieve, using the read-only node, the log indicating the shared storage has been updated; and discard logs up to the log indicating the shared storage has been updated, including the retrieved set of logs corresponding to the update query. In this example, additionally or alternatively, updating the read-only node using the retrieved set of logs corresponding to the update query comprises: performing actions described in the retrieved set of logs corresponding to the update query to update a mapping of the graph database in the read-only node; and retrieving, using the read-only node, one or more pages from the shared storage using the mapping table of the graph database in the shared storage. In this example, additionally or alternatively, updating the read-only node using the retrieved set of logs corresponding to the update query further comprises: if the shared storage does not contain a page described in the retrieved set of logs corresponding to the update query, creating a copy of the page in the cache memory of the read-only node. In this example, additionally or alternatively, updating the read-write node based on the update query comprises performing a page split. In this example, additionally or alternatively, the shared storage is an append-only shared storage. In this example, additionally or alternatively, the graph database comprises a Bw-tree graph database.

Another example provides a method for efficiency synchronization on a graph database, the method comprising: implementing the graph database using at least: a read-write node and a read-only node operating in cache memory; and a shared storage for data persistence, wherein the shared storage stores a mapping table of the graph database; receiving an update query; updating the read-write node based on the update query; writing, using the read-write node, a set of logs corresponding to the update query to a write-ahead log (WAL) journal in the shared storage; and retrieving, using the read-only node, the set of logs corresponding to the update query from the WAL journal. In this example, additionally or alternatively, the method further comprises: asynchronously flushing the cache memory of the read-write node to the shared storage; updating the mapping table of the graph database in the shared storage based on the update query; synchronous with the updating of the mapping table in the shared storage, writing a log in the WAL journal indicating the shared storage has been updated; and retrieving, using the read-only node, the log indicating the shared storage has been updated. In this example, additionally or alternatively, the method further comprises: updating the read-only node using the retrieved set of logs corresponding to the update query; and discarding logs up to the log indicating the shared storage has been updated, including the retrieved set of logs corresponding to the update query. In this example, additionally or alternatively, the method further comprises: receiving, using the read-only node, a query requesting access to a data element affected by the update of the read-write node; updating the read-only node using the retrieved set of logs corresponding to the update query; and returning, using the read-only node, a query result containing the data element. In this example, additionally or alternatively, the method further comprises: asynchronously flushing the cache memory of the read-write node to the shared storage; updating the mapping table of the graph database in the shared storage based on the update query; synchronous with the updating of the mapping table in the shared storage, writing a log in the WAL journal indicating the shared storage has been updated; retrieving, using the read-only node, the log indicating the shared storage has been updated; and discarding logs up to the log indicating the shared storage has been updated, including the retrieved set of logs corresponding to the update query. In this example, additionally or alternatively, updating the read-only node using the retrieved set of logs corresponding to the update query comprises: performing actions described in the retrieved set of logs corresponding to the update query to update a mapping of the graph database in the read-only node; retrieving, using the read-only node, one or more pages from the shared storage using the mapping table of the graph database in the shared storage; and if the shared storage does not contain a page described in the retrieved set of logs corresponding to the update query, creating a copy of the page in the cache memory of the read-only node. In this example, additionally or alternatively, updating the read-write node based on the update query comprises performing a page split. In this example, additionally or alternatively, the shared storage is an append-only shared storage. In this example, additionally or alternatively, the graph database comprises a Bw-tree graph database.

Another example provides a method for efficiency synchronization on a Bw-tree graph database, the method comprising: implementing the Bw-tree graph database using at least: a read-write node and a read-only node operating in cache memory; and an append-only shared cloud storage for data persistence; updating the read-write node based on a received update query; writing, using the read-write node, a set of logs corresponding to the received update query to a write-ahead log (WAL) journal in the append-only shared cloud storage; asynchronously flushing the cache memory of the read-write node to the append-only shared cloud storage; updating the append-only shared cloud storage based on the update query; synchronous with the updating of the append-only shared cloud storage, writing a log in the WAL journal indicating the append-only shared cloud storage has been updated; and synchronizing the read-only node to be consistent with the read-write node.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for efficient synchronization on a graph database, the computing system comprising:
processing circuitry and memory storing instructions that, during execution, causes the processing circuitry to:
implement the graph database using at least:
a read-write node and a read-only node operating in cache memory; and
a shared storage for data persistence, wherein the shared storage stores a mapping table of the graph database;
receive an update query;
update the read-write node based on the update query;

write, using the read-write node, a set of logs corresponding to the update query to a write-ahead log (WAL) journal in the shared storage;
retrieve, using the read-only node, the set of logs corresponding to the update query from the WAL journal;
asynchronously flush the cache memory of the read-write node to the shared storage; and
after the flushing of the cache memory of the read-write node to the shared storage, update the mapping table of the graph database in the shared storage based on the update query.

2. The computing system of claim 1, wherein the instructions, during execution, further causes the processing circuitry to:
synchronous with the updating of the mapping table in the shared storage, write a log in the WAL journal indicating the shared storage has been updated; and
retrieve, using the read-only node, the log indicating the shared storage has been updated.

3. The computing system of claim 2, wherein the instructions, during execution, further causes the processing circuitry to:
update the read-only node using the retrieved set of logs corresponding to the update query; and
discard logs up to the log indicating the shared storage has been updated, including the retrieved set of logs corresponding to the update query.

4. The computing system of claim 1, wherein the instructions, during execution, further causes the processing circuitry to:
receive, using the read-only node, a query requesting access to a data element affected by the update of the read-write node;
update the read-only node using the retrieved set of logs corresponding to the update query; and
return, using the read-only node, a query result containing the data element.

5. The computing system of claim 4, wherein the instructions, during execution, further causes the processing circuitry to:
synchronous with the updating of the mapping table in the shared storage, write a log in the WAL journal indicating the shared storage has been updated;
retrieve, using the read-only node, the log indicating the shared storage has been updated; and
discard logs up to the log indicating the shared storage has been updated, including the retrieved set of logs corresponding to the update query.

6. The computing system of claim 4, wherein updating the read-only node using the retrieved set of logs corresponding to the update query comprises:
performing actions described in the retrieved set of logs corresponding to the update query to update a mapping of the graph database in the read-only node; and
retrieving, using the read-only node, one or more pages from the shared storage using the mapping table of the graph database in the shared storage.

7. The computing system of claim 6, wherein updating the read-only node using the retrieved set of logs corresponding to the update query further comprises:
if the shared storage does not contain a page described in the retrieved set of logs corresponding to the update query, creating a copy of the page in the cache memory of the read-only node.

8. The computing system of claim 1, wherein updating the read-write node based on the update query comprises performing a page split.

9. The computing system of claim 1, wherein the shared storage is an append-only shared storage.

10. The computing system of claim 1, wherein the graph database comprises a Bw-tree graph database.

11. A method for efficiency synchronization on a graph database, the method comprising:

implementing the graph database using at least:

a read-write node and a read-only node operating in cache memory; and a shared storage for data persistence, wherein the shared storage stores a mapping table of the graph database;

receiving an update query;

updating the read-write node based on the update query;

writing, using the read-write node, a set of logs corresponding to the update query to a write-ahead log (WAL) journal in the shared storage;

retrieving, using the read-only node, the set of logs corresponding to the update query from the WAL journal;

asynchronously flushing the cache memory of the read-write node to the shared storage; and after the flushing of the cache memory of the read-write node to the shared storage, updating the mapping table of the graph database in the shared storage based on the update query.

12. The method of claim 11, further comprising:

synchronous with the updating of the mapping table in the shared storage, writing a log in the WAL journal indicating the shared storage has been updated; and retrieving, using the read-only node, the log indicating the shared storage has been updated.

13. The method of claim 12, further comprising:

updating the read-only node using the retrieved set of logs corresponding to the update query; and discarding logs up to the log indicating the shared storage has been updated, including the retrieved set of logs corresponding to the update query.

14. The method of claim 11, further comprising:

receiving, using the read-only node, a query requesting access to a data element affected by the update of the read-write node;

updating the read-only node using the retrieved set of logs corresponding to the update query; and returning, using the read-only node, a query result containing the data element.

15. The method of claim 14, further comprising:

synchronous with the updating of the mapping table in the shared storage, writing a log in the WAL journal indicating the shared storage has been updated;

retrieving, using the read-only node, the log indicating the shared storage has been updated; and discarding logs up to the log indicating the shared storage has been updated, including the retrieved set of logs corresponding to the update query.

16. The method of claim 14, wherein updating the read-only node using the retrieved set of logs corresponding to the update query comprises:

performing actions described in the retrieved set of logs corresponding to the update query to update a mapping of the graph database in the read-only node;

retrieving, using the read-only node, one or more pages from the shared storage using the mapping table of the graph database in the shared storage; and if the shared storage does not contain a page described in the retrieved set of logs corresponding to the update query, creating a copy of the page in the cache memory of the read-only node.

17. The method of claim 11, wherein updating the read-write node based on the update query comprises performing a page split.

18. The method of claim 11, wherein the shared storage is an append-only shared storage.

19. The method of claim 11, wherein the graph database comprises a Bw-tree graph database.

20. A method for efficiency synchronization on a Bw-tree graph database, the method comprising:

implementing the Bw-tree graph database using at least:

a read-write node and a read-only node operating in cache memory; and an append-only shared cloud storage for data persistence;

updating the read-write node based on a received update query;

writing, using the read-write node, a set of logs corresponding to the received update query to a write-ahead log (WAL) journal in the append-only shared cloud storage;

retrieving, using the read-only node, the set of logs corresponding to the update query from the WAL journal asynchronously flushing the cache memory of the read-write node to the append-only shared cloud storage;

updating the append-only shared cloud storage based on the update query;

synchronous with the updating of the append-only shared cloud storage, writing a log in the WAL journal indicating the append-only shared cloud storage has been updated; and synchronizing the read-only node to be consistent with the read-write node.

* * * * *